(12) United States Patent
Eckart et al.

(10) Patent No.: US 7,050,460 B1
(45) Date of Patent: May 23, 2006

(54) METHOD AND APPARATUS FOR MULTIPLEXING DATA STREAMS USING TIME CONSTRAINTS

(75) Inventors: Stefan Eckart, Mountain View, CA (US); Fabio Ingrao, San Francisco, CA (US)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/549,782

(22) Filed: Apr. 14, 2000

(51) Int. Cl.
    *H04J 3/24* (2006.01)
(52) U.S. Cl. ...................... 370/473; 370/538
(58) Field of Classification Search ............. 370/389, 370/391, 395.21, 395.4, 412, 474, 473, 538, 370/537, 477, 465, 468
See application file for complete search history.

(56) References Cited

U.S. PATENT DOCUMENTS

| | | | | |
|---|---|---|---|---|
| 5,481,543 A | * | 1/1996 | Veltman | 370/473 |
| 5,566,174 A | * | 10/1996 | Sato et al. | 370/468 |
| 5,619,341 A | * | 4/1997 | Auyeung et al. | 358/404 |
| 5,652,627 A | * | 7/1997 | Allen | 348/497 |
| 5,729,540 A | * | 3/1998 | Wegrzyn | 370/336 |
| 5,774,455 A | * | 6/1998 | Kawase et al. | 370/232 |
| 5,793,431 A | * | 8/1998 | Blanchard | 375/240.01 |
| 5,793,436 A | * | 8/1998 | Kim | 348/447 |
| 5,835,493 A | * | 11/1998 | Magee et al. | 370/395.62 |
| 5,913,031 A | * | 6/1999 | Blanchard | 709/204 |
| 6,064,676 A | * | 5/2000 | Slattery et al. | 370/412 |
| 6,188,700 B1 | * | 2/2001 | Kato et al. | 370/477 |
| 6,345,122 B1 | * | 2/2002 | Yamato et al. | 382/232 |
| 6,351,564 B1 | * | 2/2002 | Martin | 382/233 |
| 6,598,172 B1 | * | 7/2003 | VanDeusen et al. | 713/503 |

* cited by examiner

*Primary Examiner*—John Pezzlo
*Assistant Examiner*—Dmitry Levitan
(74) *Attorney, Agent, or Firm*—Vedder, Price, Kaufman & Kammholz, P.C.

(57) ABSTRACT

A method and apparatus for multiplexing data streams is provided. An earliest time and a latest time are determined for each packet of a each data stream. The packets of the data streams are multiplexed so as to meet earliest time and latest time requirements. The calculation of the earliest time and the latest time are simplified by allowing use of linear constraints rather than irregular stairstep constraints. Compensation for drift in the data streams is also provided.

44 Claims, 18 Drawing Sheets

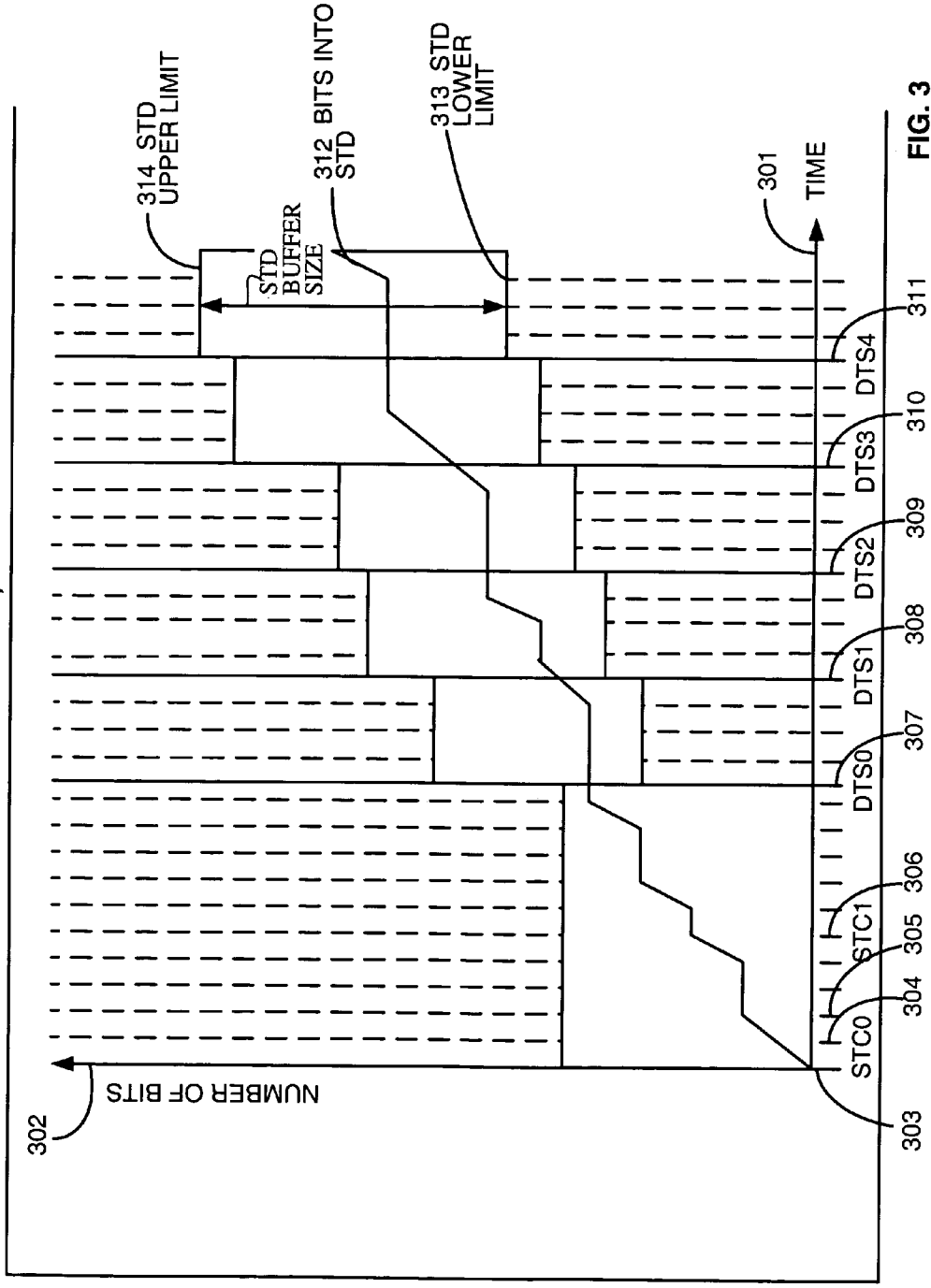

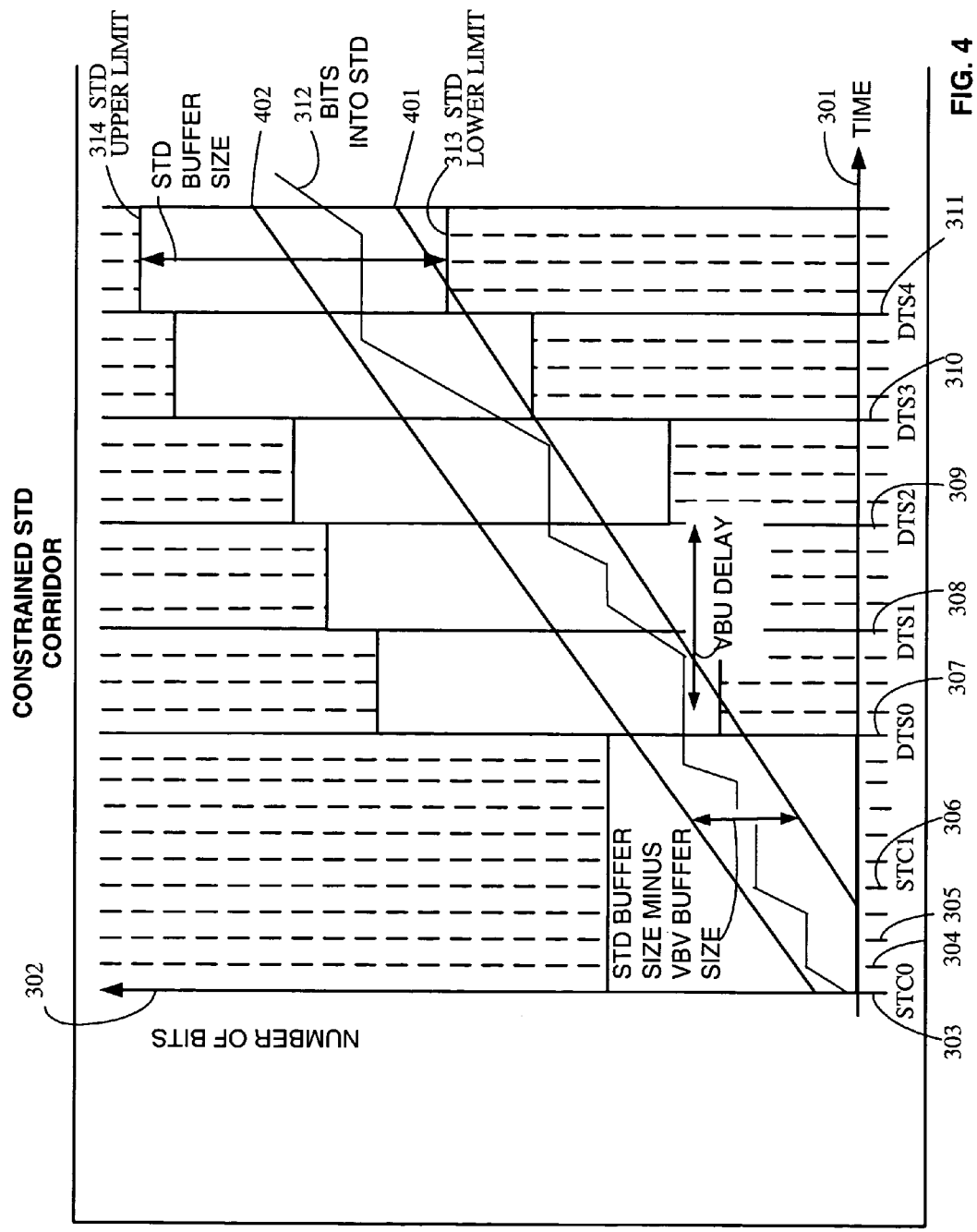

METHOD AND APPARATUS FOR MULTIPLEXING DATA STREAMS USING TIME CONSTRAINTS

TECHNICAL FIELD OF THE INVENTION

The invention relates generally to processing data streams and more specifically to multiplexing data streams in a manner compatible with finite-length buffers.

BACKGROUND OF THE INVENTION

Various types of data streams are processed using data processing technology. Examples of these data streams include video, audio, and closed captioning. Video data is often compressed to reduce bandwidth requirements. As an example, video data is often compressed into a Moving Picture Experts Group (MPEG) format.

Video data is comprised of sequences of frames, wherein each frame constitutes an instantaneous image. As the frames are displayed in sequence the appearance of a moving picture is formed. While each frame may be considered to contain a certain amount of information, that amount of information may be reduced if some of the information is redundant with information contained in other frames. Thus, the overall amount of information being transmitted may be reduced. As the amount information contained in different frames is reduced by different amounts, the bit lengths of the frames of data vary relative to other frames of data. Thus, the video data is represented as variable-frame-length data.

Audio data is comprised of sequences of samples, wherein each sample constitutes instantaneous information about an audio signal. Since audio data does not exhibit sample-to-sample redundancy in the same manner as video data, communication or compression of audio data generally does not involve variable-sample-length data. Thus, audio samples typically occupy a fixed length in the data stream. Typically, a compressed audio stream is comprised of a sequence of fixed size audio frames, each of which represents a fixed number of audio samples.

It is often useful to combine various types of data streams into a single data stream. A multiplexer may be used to combine the data streams. The multiplexer combines portions of the different data streams to form a combined data stream. To obtain the portions of the different data streams, the data streams may be divided into packets, which are usually of fixed size.

FIG. 1 is a block diagram illustrating a multiplexer system and the multiplexer system for multiplexing and demultiplexing data streams as is known in the art. The multiplexer system includes multiplexer 101. Multiplexer 101 receives video stream input 108, audio stream input 109, and closed caption stream input 110. Multiplexer 101 produces a multiplexed output stream 111.

The demultiplexer system includes demultiplexer 102, Video Buffer Verifier (VBV) buffer 103, video System Target Decoder (STD) buffer 104, audio STD buffer 105, video decoder 106, and audio decoder 107. Demultiplexer 102 provides closed caption stream 114. Demultiplexer 102 also provides signal 112 to VBV buffer 103 and to video STD buffer 104. VBV buffer 103 provides a signal 115 to video decoder 106. Video STD buffer 104 provides a signal 116 to video decoder 106. Video decoder 106 provides video stream 118. VBV buffer 103 and video STD buffer 104 are typically combined into a single block.

Demultiplexer 102 also provides signal 113 to audio STD buffer 105. Audio STD buffer 105 provides a signal 117 to audio decoder 107. Audio decoder 107 provides audio stream 119.

FIG. 2 is a timing diagram illustrating a video data stream and an audio data stream as is known in the art. Video stream 201 includes several frames of video data. Each frame of video data is associated with a decoding time stamp. The first frame of video data is associated with decoding time stamp 203 (DTS V0). The second frame of video data is associated with decoding time stamp 204 (DTS V1). The third frame of video data is associated with decoding time stamp 205 (DTS V2). The fourth frame of video data is associated with decoding time stamp 206 (DTS V3). The fifth frame of video data is associated with decoding time stamp 207 (DTS V4). The sixth frame of video data is associated with the time stamp 208 (DTS V5). The seventh frame of video data is associated with decoding time stamp 209 (DTS V6). The eighth frame of video data is associated with decoding time stamp 210 (DTS V7). The ninth frame of video data is associated with decoding time stamp 211 (DTS V8). The tenth frame of video data is associated with decoding time stamp 212 (DTS V9).

To multiplex a video data stream with other data streams, the video data stream 201 is divided into several packets. These include packet A 242, packet B 243, packet C 244, packet D 245, packet E 246, and packet F 247. The video data stream may be divided into packets independently of its video frames. This is particularly well illustrated in the case of variable-frame-length data.

Audio stream 202 includes several audio frames. Each frame is associated with a decoding time stamp. The first audio frame is associated with decoding time stamp 213 (DTS A0). The second audio frame is associated with decoding time stamp 214 (DTS A1). The third audio frame is associated with decoding time stamp 215 (DTS A2). The fourth audio frame is associated with decoding time stamp 216 (DTS A3). The fifth audio frame is associated with decoding time stamp 217 (DTS A4). The sixth audio frame is associated with decoding time stamp 218 (DTS A5). The seventh audio frame is associated with decoding time stamp 219 (DTS A6). The eighth audio frame is associated with decoding time stamp 220 (DTS A7). The ninth audio frame is associated with decoding time stamp 221 (DTS A8). The tenth audio frame is associated with decoding time stamp 222 (DTS A9). The eleventh audio frame is associated with decoding time stamp 223 (DTS A10). The twelfth audio frame is associated with decoding time stamp 224 (DTS A11). The thirteenth audio frame is associated with decoding time stamp 225 (DTS A12). The fourteenth audio frame is associated with decoding time stamp 226 (DTS A13). The fifteenth audio frame is associated with decoding time stamp 227 (DTS A14). The sixteenth audio frame is associated with decoding time stamp 228 (DTS A15). The seventeenth audio frame is associated with decoding time stamp 229 (DTS A16). The eighteenth audio frame is associated with decoding time stamp 230 (DTS A17). The nineteenth audio frame is associated with decoding time stamp 231 (DTS A18). The twentieth audio frame is associated with decoding time stamp 232 (DTS A19). The twenty-first audio frame is associated with decoding time stamp 233 (DTS A20). The twenty-second audio frame is associated with decoding time stamp 234 (DTS A21).

To multiplex the audio stream with other data streams, the audio stream may be divided into several packets. These packets may include packet A' 248, packet B' 249, packet C'

250, packet D' 251, packet E' 252, and packet F' 253. The audio stream may be divided into packets independently of the audio frames.

Since video data typically requires higher bandwidth than audio data, the process of combining portions of a video data stream with portions of an audio data stream usually involves interleaving several packets of video data with one packet of audio data. If video data and audio data were provided at a constant bit rate, video and audio packets could simply be interleaved at a fixed ratio. However, the rates are not necessarily constant. Some data sources produce video and audio data at inaccurate rates. For example, a video source that should produce 30 frames per second of video data may instead produce 31 frames per second. Also, the frame rates change during modes such as fast forward and rewind.

If data stream processing apparatus were provided with a buffer of infinite length, all video and audio data would always be available and the appropriate portions of the audio and video data could be played at the appropriate times. However, in practice, buffer sizes are limited. Limited buffer sizes place constraints on the manner in which different data streams may be multiplexed. For example, when video data and audio data are multiplexed, a portion of the video data and the corresponding portion of the audio data should be multiplexed such that both the portion of the video data and the portion of the audio data may be simultaneously present in a buffer to allow for simultaneous playback.

In the MPEG format, a system target decoder (STD) buffer is defined as having a fixed size, referred to as the STD buffer size. The STD buffer places constraints on the multiplexing of multiple data streams.

FIG. 3 is a diagram illustrating communication of a data stream over time relative to a system target decoder (STD) as is known in the art. In this diagram, the horizontal axis 301 represents time. The vertical axis 302 represents a number of bits. At the beginning 303 of a first clock cycle (at or near system time clock 0 (STC0)), communication of the data stream begins. During the first clock cycle, a first packet of the data stream is transmitted. This is represented by the number of bits 312 increasing during the first clock cycle. From the beginning 304 of a second clock cycle to the beginning 305 of a third clock cycle, no additional packets are transmitted. This is represented by the number of bits 312 remaining constant during the second clock cycle. This time may be used to transmit packets of other data streams being multiplexed with this data stream. Additional packets of this data stream are transmitted at varying intervals over additional clock cycles, although, during some additional clock cycles, such as that having beginning 306, no additional packets are transmitted. Thus, the number of bits 312 increases monotonically over many clock cycles.

When a first decoding time stamp 307 (DTS0) arrives in time, a first frame of the video stream is decoded or otherwise processed. Before the first decoding time stamp 307 arrives, the packets being transmitted are stored in a STD buffer that has a capacity represented by the height of the segment of STD upper limit 314 before decoding time stamp 307 (DTS0). After the first frame of the video stream is decoded or otherwise processed, the amount of the STD buffer used to store the first frame of the video stream is made available to store additional packets. This is indicated by the STD lower limit 313 and the STD upper limit 314 increasing at decoding time stamp 307 (DTS0) by an amount representative of the number of bits in the first frame of the video stream. The distance between the STD upper limit 314 and the STD lower limit 313 represents the size of the STD buffer.

When a second decoding time stamp 308 (DTS1) arrives in time, a second frame of the video stream is decoded or otherwise processed. Thus, the STD lower limit 313 and the STD upper limit 314 increase correspondingly at the second decoding time stamp 308 (DTS1). Since the second frame of the video stream is shorter (i.e., has fewer bits) than the first frame of the video stream, the amount of the increase in the STD lower limit 313 and the STD upper limit 314 is less at second decoding time stamp 308 (DTS 1) than at the first decoding time stamp 307 (DTS0).

At subsequent decoding time stamps 309 (DTS2), 310 (DTS3), and 311 (DTS4), the STD lower limit 313 and the STD upper limit 314 continue to increase over time. Likewise, the number of bits 312 increases as additional packets are transmitted. The rate at which the number of bits 312 increases is constrained by the capacity of the STD buffer. If the number of bits 312 were to exceed the STD upper limit 314, the STD buffer would overflow, resulting in lost data. If the number of bits 312 were to fall below the STD lower limit 313, the STD buffer would underflow, resulting in insufficient data available to decode or otherwise process a frame of the video stream at its corresponding decoding time stamp.

While maintaining the number of bits 312 between the STD upper limit 314 and the STD lower limit 313 results in a data stream that is compatible with the STD buffer, the timing of the data stream is not optimal and is computationally inefficient to obtain. Thus, a improved technique for multiplexing data streams is needed.

DETAILED DESCRIPTION OF A PREFERRED EMBODIMENT

A method and apparatus for multiplexing data streams is provided. An earliest time and a latest time are determined for each packet of a each data stream. The packets of the data streams are multiplexed so as to meet earliest time and latest time requirements. The calculation of the earliest time and the latest time are simplified by allowing use of linear constraints rather than irregular stairstep constraints. Compensation for drift in the data streams is also provided.

Figure 1:
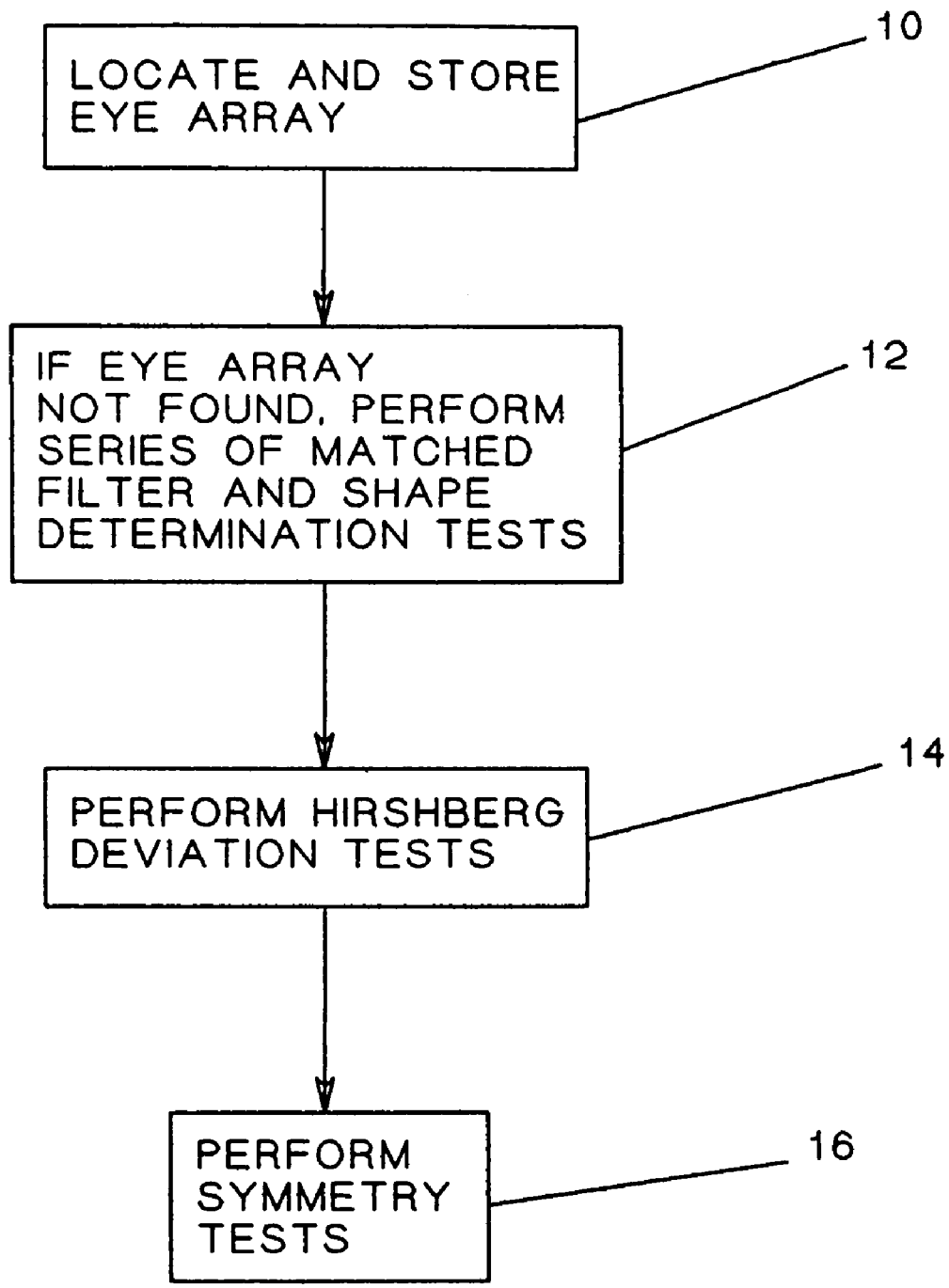
FIG. 1 is a block diagram illustrating a multiplexer system and the multiplexer system for multiplexing and demultiplexing data streams as is known in the art.
Figure 2:
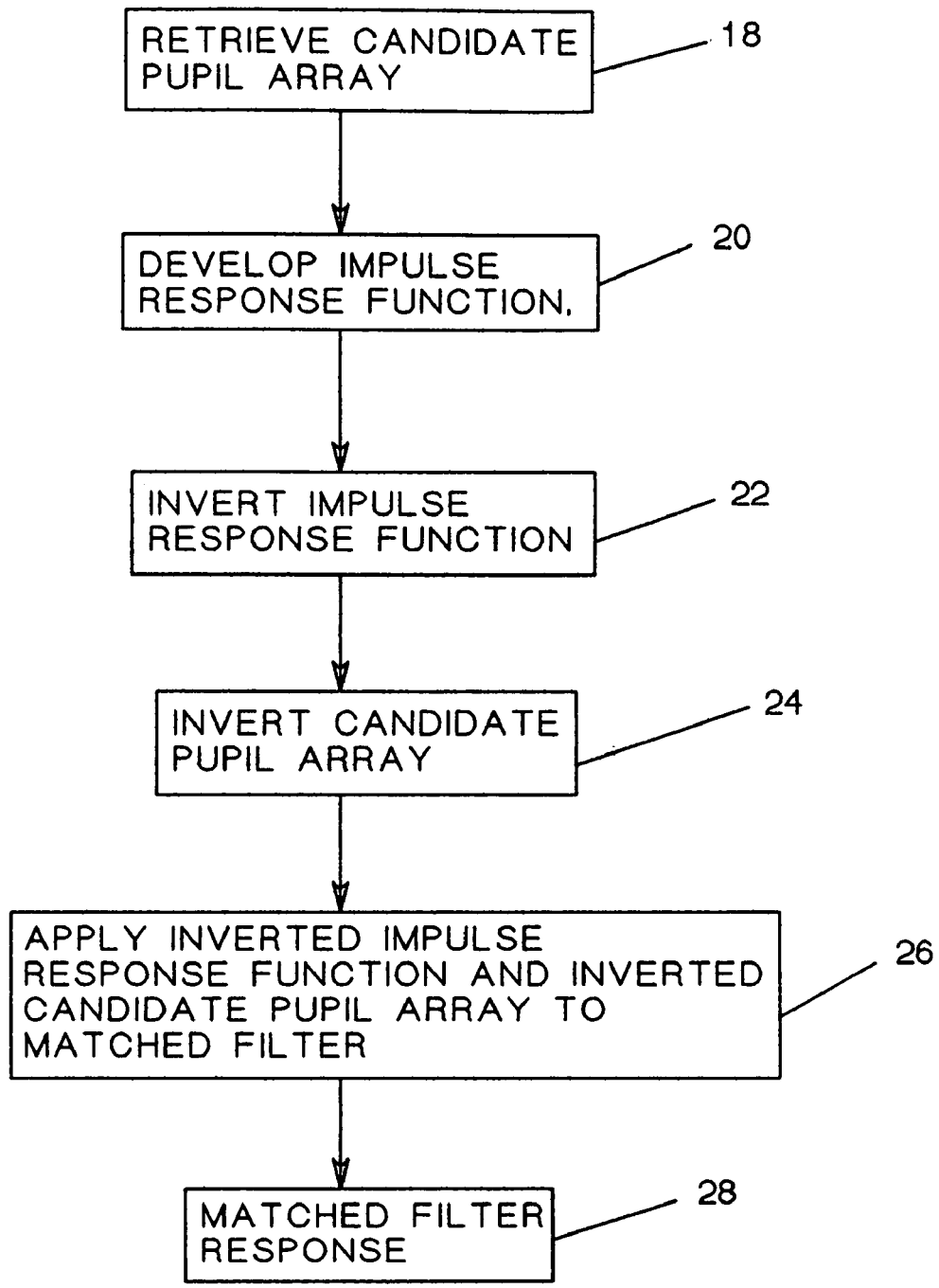
FIG. 2 is a timing diagram illustrating a video data stream and an audio data stream as is known in the art.
Figure 2A:
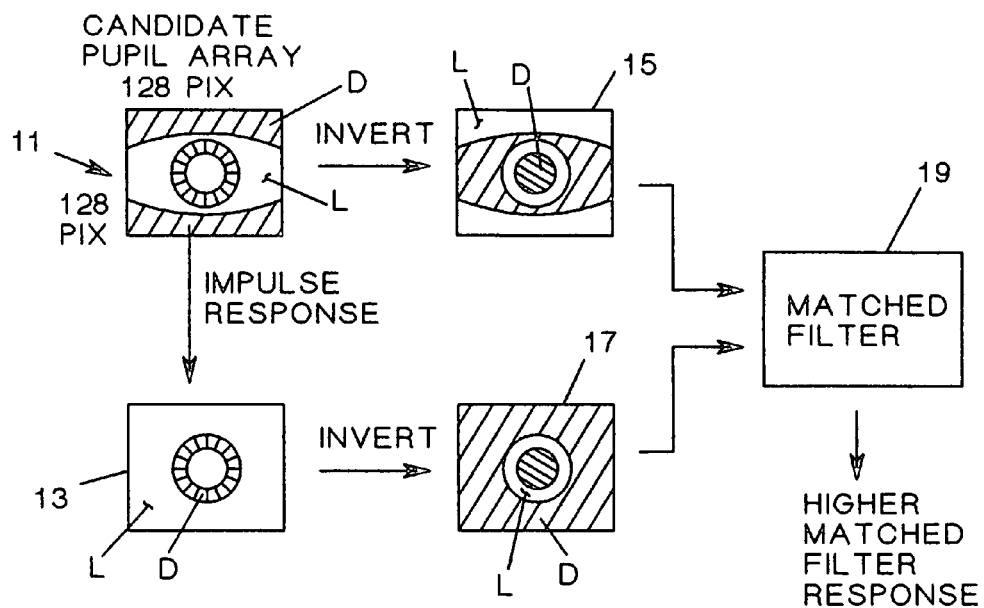
Figure 3A:
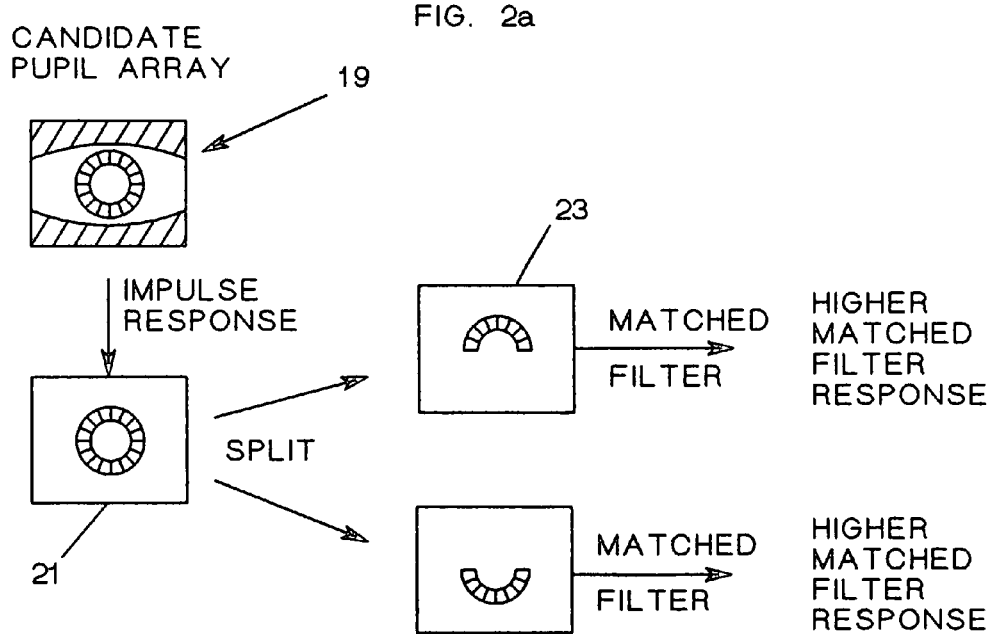
FIG. 3 is a diagram illustrating communication of a data stream over time relative to a system target decoder (STD) as is known in the art.
Figure 4A:
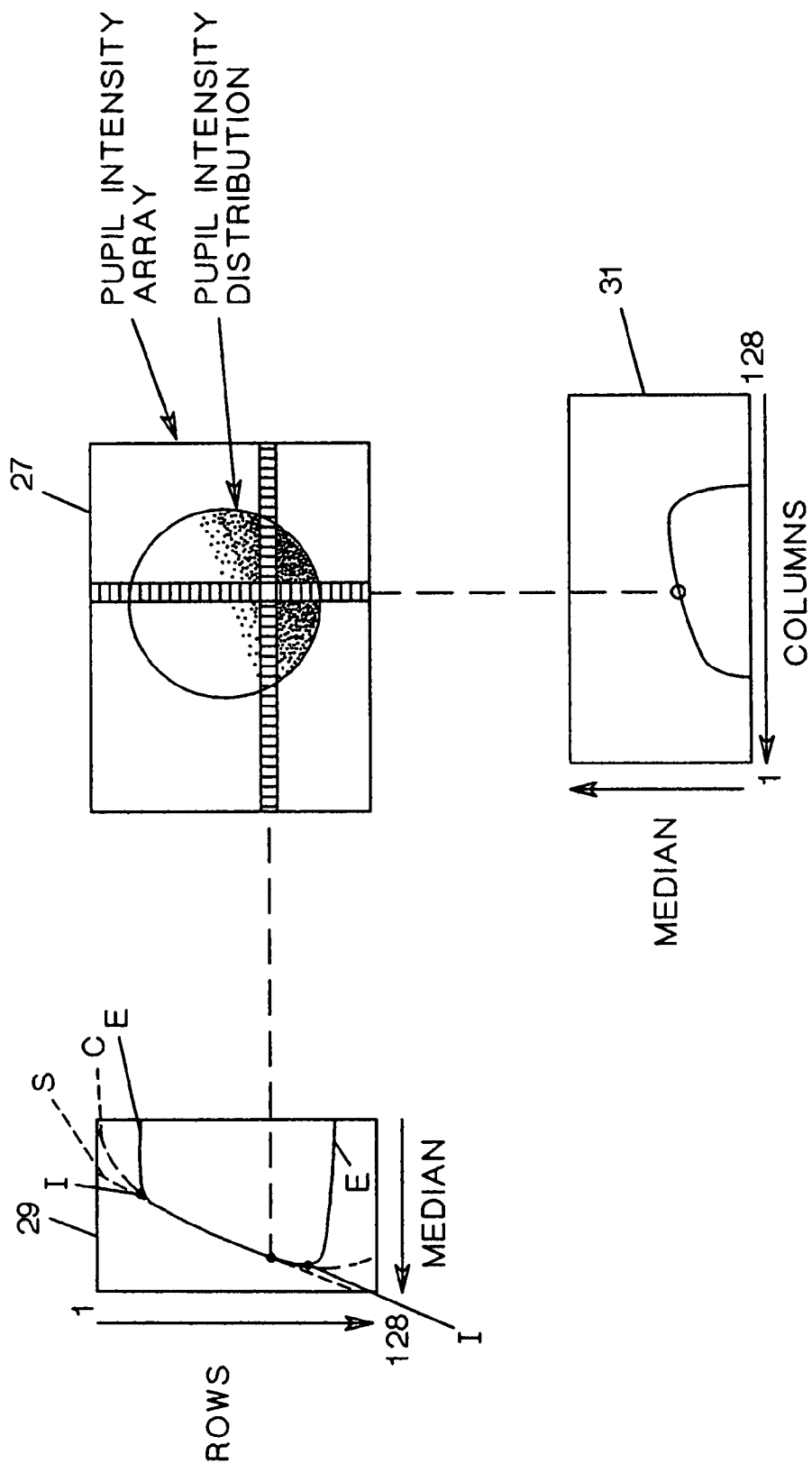
FIG. 4 is a diagram illustrating a constrained STD corridor defined relative to the data stream in accordance with the present invention.

FIG. 4 is a diagram illustrating a constrained STD corridor defined relative to the data stream in accordance with the present invention. The constrained STD corridor exists between lower limit 401 and upper limit 402 and extends over time as the lower limit 401 and the upper limit 402 change, wherein the lower limit 401 may also be referred to as a lowest bit occurrence and the upper limit 402 may also be referred to as a highest bit occurrence. The distance between the upper limit 402, the highest bit occurrence, and the lower limit 401, the lowest bit occurrence, is preferably equal to the STD buffer size minus the VBV buffer size. While the lower limit 401, the lowest bit occurrence, and the upper limit 402, the highest bit occurrence, may appear to extend as straight lines over time, they may vary to accommodate drift of data input streams being multiplexed.

Figure 5:
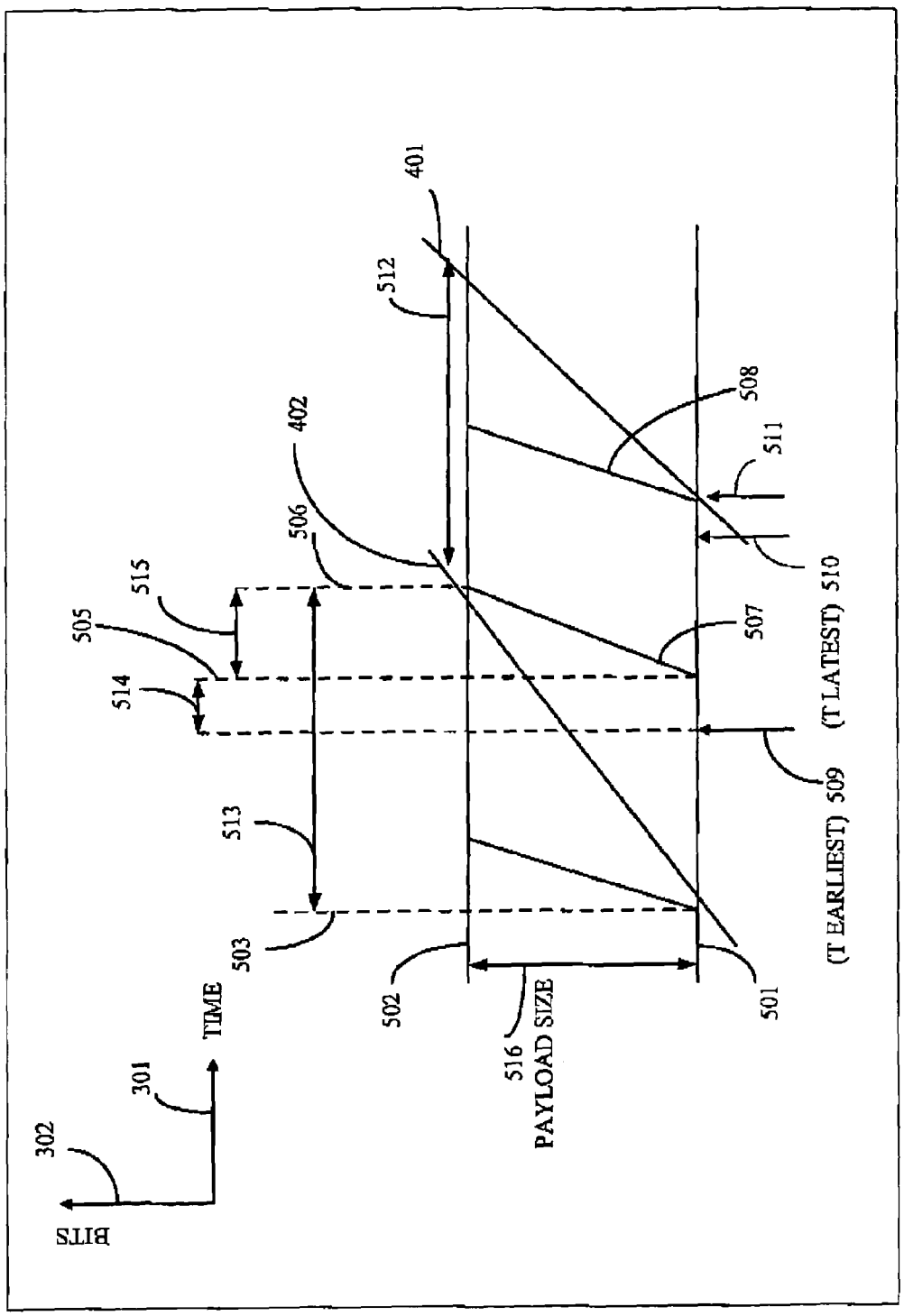
FIG. 5 is a diagram illustrating a range of occurrence of a packet of a video data stream within a constrained STD corridor in accordance with the present invention.

FIG. 5 is a diagram illustrating a range of occurrence of a packet of a video data stream within a constrained STD corridor in accordance with the present invention. In this diagram, time is illustrated along horizontal axis 301, while a number of bits is represented along a vertical axis 302. A first data byte in a packet is represented as occurring along vertical axis 302 at a number of bits marked by line 501. A last data byte in the packet is represented as occurring along vertical axis 302 at a number of bits marked by line 502. Thus, the payload size 516 (e.g., the number of data bits in the packet) is equal to the difference between line 502 and line 501.

Upper limit 402 may be defined according to the payload size and the video rate of the video stream being multiplexed. Thus, if the video rate drifts, the upper limit 402 is automatically compensated. Over payload size 516, upper limit 402 spans a period of time 513 between an initial time 503 and a final time 506. This period of time 513 is based on the payload size 516 divided by the video rate. Lower limit 401 may be defined with respect to upper limit 402 by shifting upper limit 402 downward or to the right. For example, upper limit 402 may be shifted to the right a distance of eight times an additional buffer size divided by a video rate. The additional buffer size may, for example, be the difference between the STD buffer size and the VBV buffer size. Alternatively, lower limit 401 may be defined according to the payload size and the video rate of the video stream being multiplexed, with upper limit 402 defined with respect to the lower limit 401 by shifting lower limit 401 upward or to the left.

The multiplexer rate is higher than the video rate. Thus, the packets of the multiplexed data stream are illustrated at a steeper angle than the video rate and the slopes of upper limit 402 and lower limit 401. As such, the earliest possible occurrence of a packet within the constraints of the upper limit 402 and the lower limit 401 is illustrated by packet 507. The latest possible occurrence of a packet within the constraints of the upper limit 402 and the lower limit 401 is illustrated by packet 508.

Transmission of the payload of packet 507 begins at time 505 and ends at time 506, spanning a period of time 515. Packet 507 also includes a header to aid in the demultiplexing process. The header begins at time 509 and ends at time 505, spanning a period of time 514. Thus, the start time for this earliest possible occurrence of a packet within the constraints of upper limit 402 and lower limit 401 occurs at time $t_{earliest}$ 509.

Transmission of the payload of packet 508 begins at time 511. The header for packet 508 begins at time 510. Thus, the start time for this latest possible occurrence of a packet within the constraints of upper limit 402 and lower limit 401 occurs at time $t_{latest}$ 510. It should be understood that packets 507 and 508 do not represent different data packets, but rather the earliest possible occurrence and the latest possible occurrence of a single data packet. Thus, the data packet may occur anywhere between packet 507 and packet 508, inclusive. Thus, the earliest time, $t_{earliest}$, and the latest time, $t_{latest}$, for a packet may be readily identified.

Figure 6:
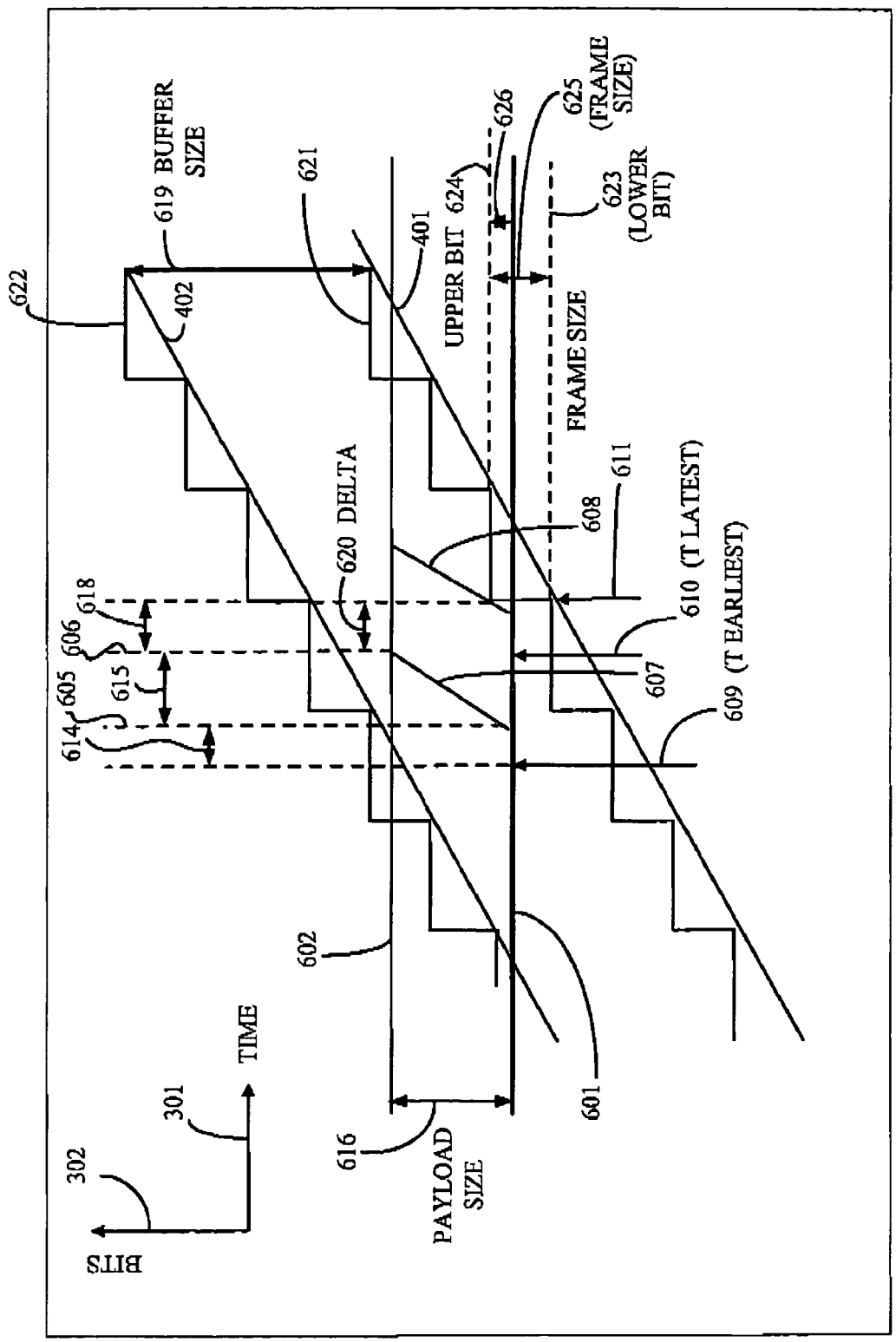
FIG. 6 is a diagram illustrating a range of occurrence of a packet of an audio data stream within a constrained STD corridor in accordance with the present invention.
Figure 6A:
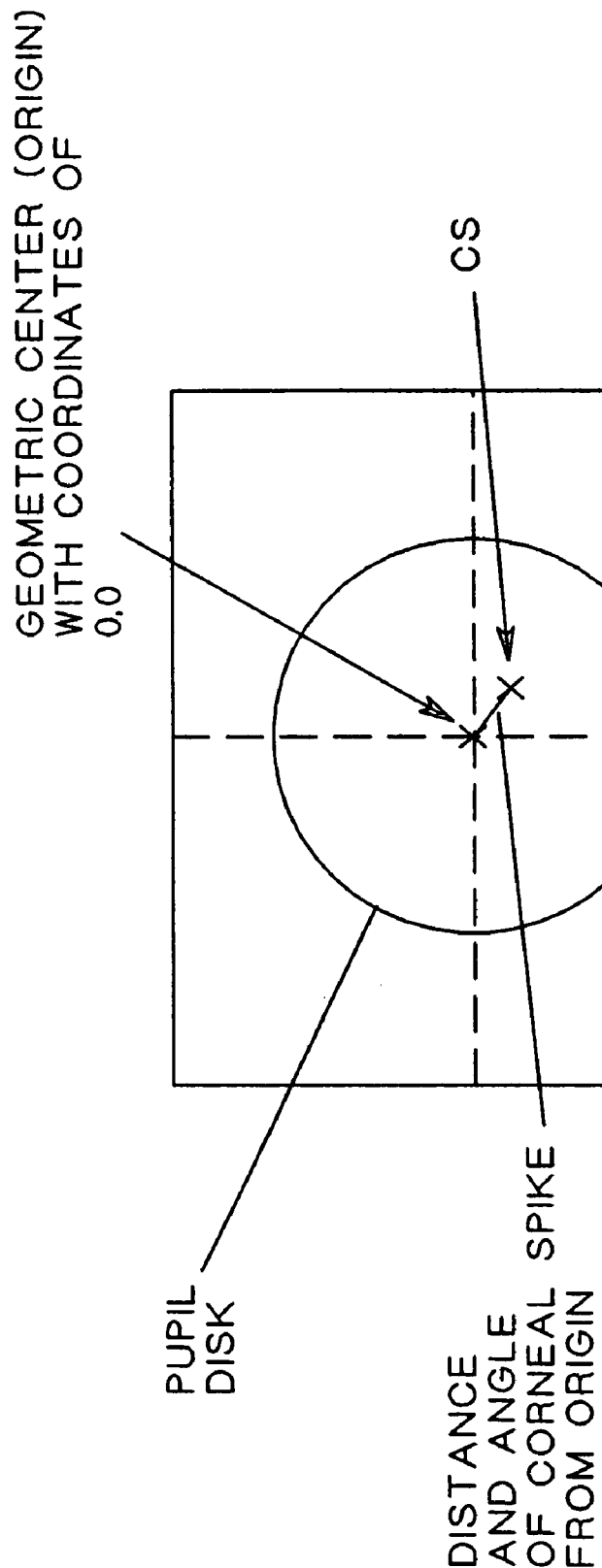

FIG. 6 is a diagram illustrating a range of occurrence of a packet of an audio data stream within a constrained STD corridor in accordance with the present invention. In the diagram, the horizontal axis 301 represents time, while the vertical axis 302 represents a number of bits. Fixed-frame-length data streams, for example, audio data streams, may be multiplexed somewhat more easily than variable-frame-length data streams. Since a regular number of bits is processed at regular intervals, the stair-step pattern representative of the buffer limits is regular. Thus, both lower limit 621 and upper limit 622 are regular stair-step patterns. Upper limit 402 is defined relative to upper limit 622, and lower limit 401 is defined relative to lower limit 621. Upper limit 402 may be obtained from lower limit 401, or lower limit 401 may be obtained from upper limit 402.

If a frame has a decoding time stamp occurring at time 611, it can be viewed as being constrained by upper limit 402 and lower limit 621. Note that upper limit 402 may be substantially linear, while lower limit 621 may be of a stair-step pattern. Thus, the earliest possible occurrence of a packet having a decoding time stamp occurring at time 611 is represented by packet 607, while the latest possible occurrence of a packet having a decoding time stamp occurring at time 611 is represented by packet 608.

The first bit of a payload of packet 607 or packet 608 occurs along vertical axis 302 at a point denoted by line 601. The last bit of the payload of packet 607 or packet 608 occurs along vertical axis 302 at a point denoted by line 602. Thus, the payload size 616 is denoted by the difference between the vertical position of line 602 and line 601.

For packet 607, the payload is transmitted over a period of time 615 between time 605 and time 606. The payload is preceded by a header that is transmitted over a period of time 614 between time 609 and time 605. Thus, the earliest time at which the transmission of packet 607 may occur is time $t_{earliest}$ 609. For packet 608, the latest time at which the transmission of packet 608 may occur is time $t_{latest}$ 610.

A time $t_{delta}$ 618 may be defined between time 606 and time 611. This time $t_{delta}$ represents the duration of delta 620. The time $t_{delta}$ 618 is useful for calculating time $t_{earliest}$.

The vertical distance between STD upper limit 622 and STD lower limit 621 is denoted by buffer size (BS) 619.

Each frame has a frame size 625 defined between an upper bit 624 of the frame and a lower bit 623 of the frame. The entire frame need not be transmitted within a single packet. Likewise, a packet may include more than one frame. For example, packet 607 or packet 608 may include a number of bits 626 of one frame along with bits of another frame or frames.

Figure 7:
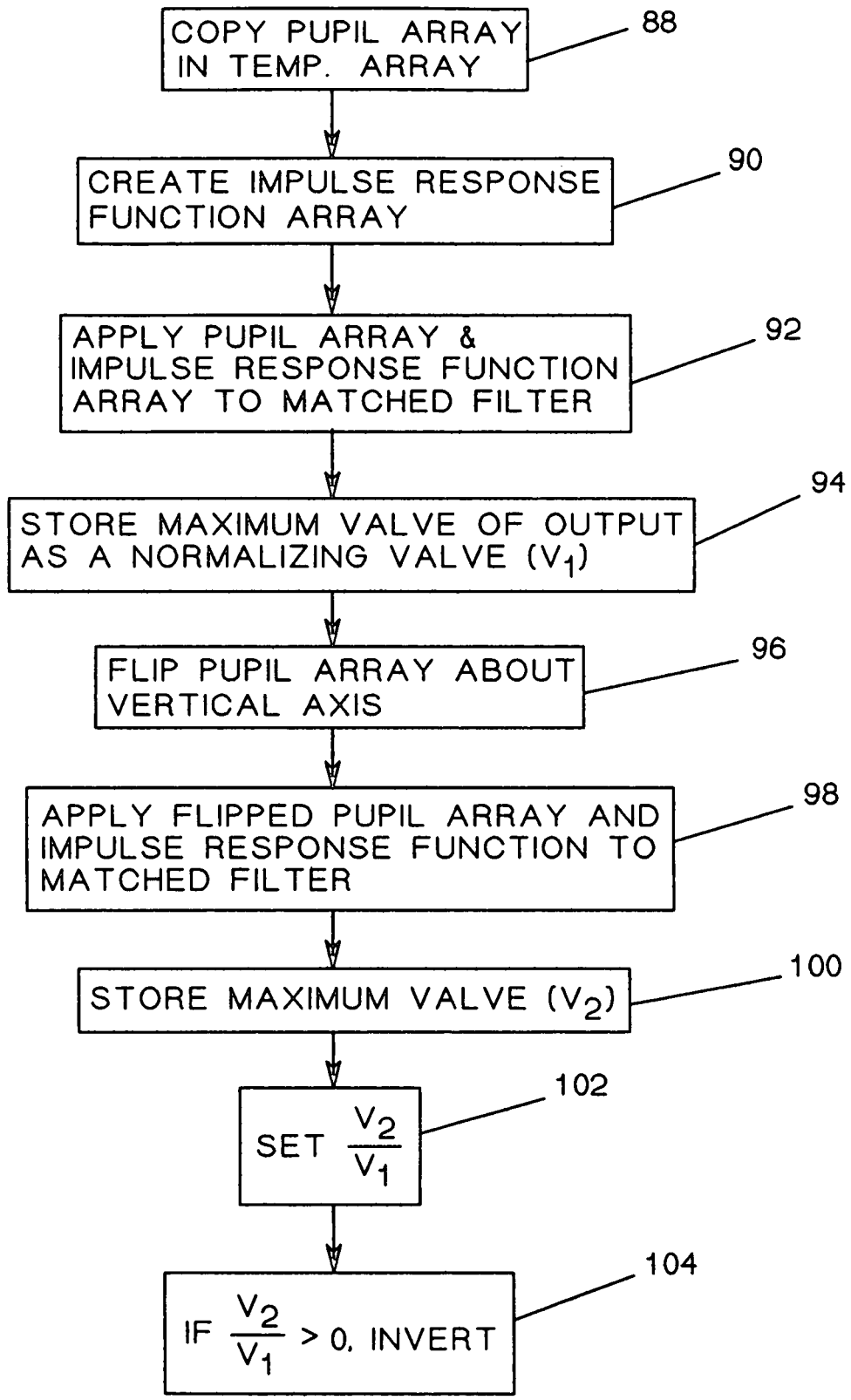
FIG. 7, FIG. 8, FIG. 9, FIG. 10, and FIG. 11 are flow diagrams illustrating a process for multiplexing data streams in accordance with the present invention.
Figure 7A:
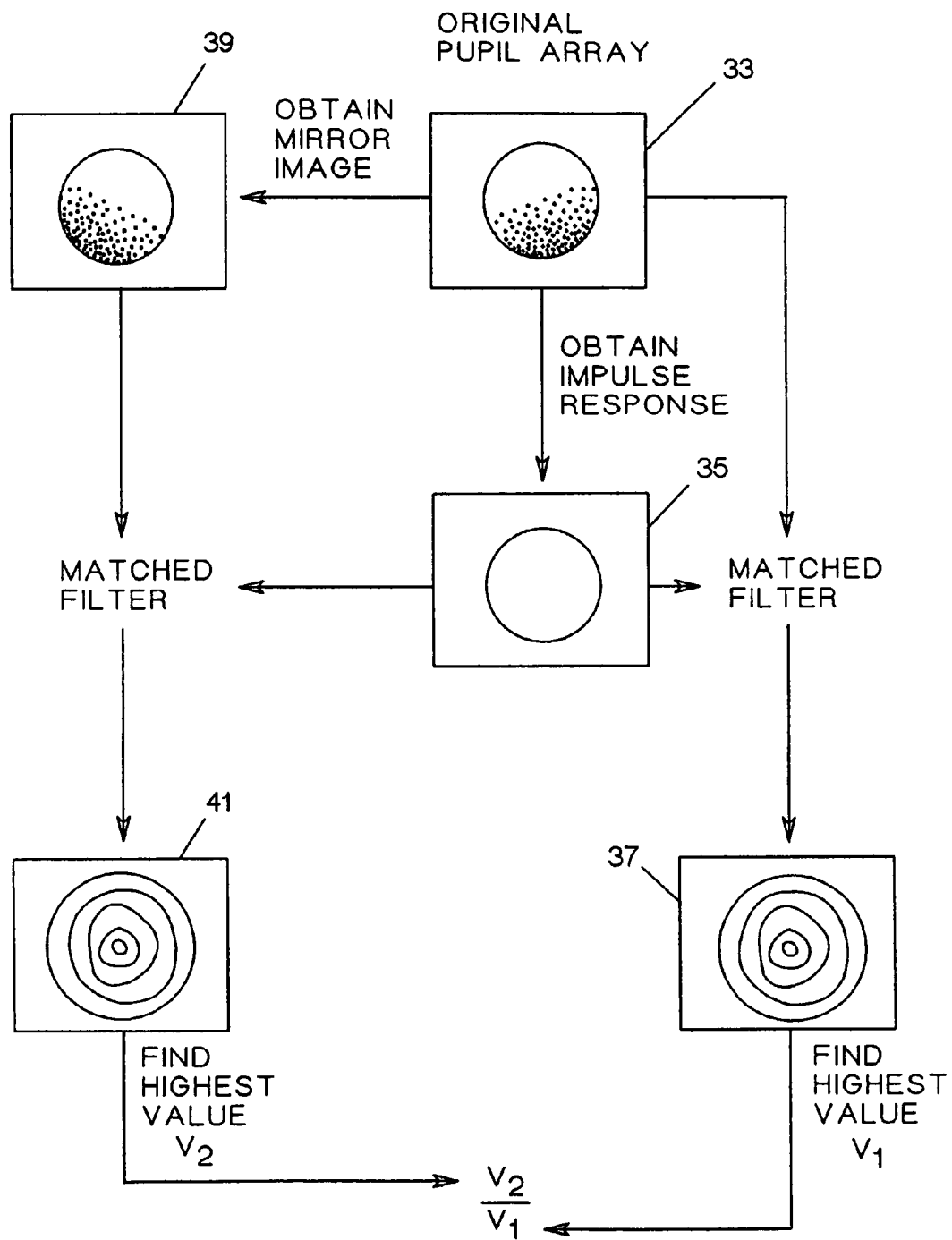

FIG. 7, FIG. 8, FIG. 9, FIG. 10, and FIG. 11 are flow diagrams illustrating a process for multiplexing data streams in accordance with the present invention. Referring to FIG. 7, the process begins in step 701. In step 702, a first input data stream is obtained. In step 703, first time stamp information for the first input data stream is obtained. In step 704, buffer delay information is obtained. In step 705, a first lowest bit occurrence constraint is determined based on the first time stamp information and the buffer delay information. In step 706, a first highest bit occurrence constraint is determined based on shifting the first lowest bit occurrence constraint upward. Step 706 may include step 707. In step 707, the first highest bit occurrence constraint is determined based on shifting the first lowest bit occurrence constraint upward by a constant amount.

In step 708, a first earliest time constraint is determined based on the first highest bit occurrence constraint. In step 709, a first latest time constraint is determined based on the first lowest bit occurrence constraint. From step 709, the process continues to reference A 710.

In an embodiment of the invention, the first lowest bit occurrence constraint increases substantially linearly over time. The first lowest bit occurrence constraint may vary from increasing linearly over time to accommodate drift of the first input data stream.

In an embodiment of the invention, the first input data stream has a substantially constant bit rate. The first input data stream may vary from a constant bit rate as influenced by drift.

In an embodiment of the invention, the first input data stream has a constant frame rate. In another embodiment of the invention, the first input data stream has a variable frame rate.

In an embodiment of the invention, the first input data stream has a constant frame size. In another embodiment of the invention, the first input data stream has a variable frame size. The first input data stream may include buffer delay information. The first input data stream may, for example, be a video stream, an audio stream, a closed caption stream, or a content protection data stream. It may be multiplexed together with other streams of these types or of other types.

Figure 8:
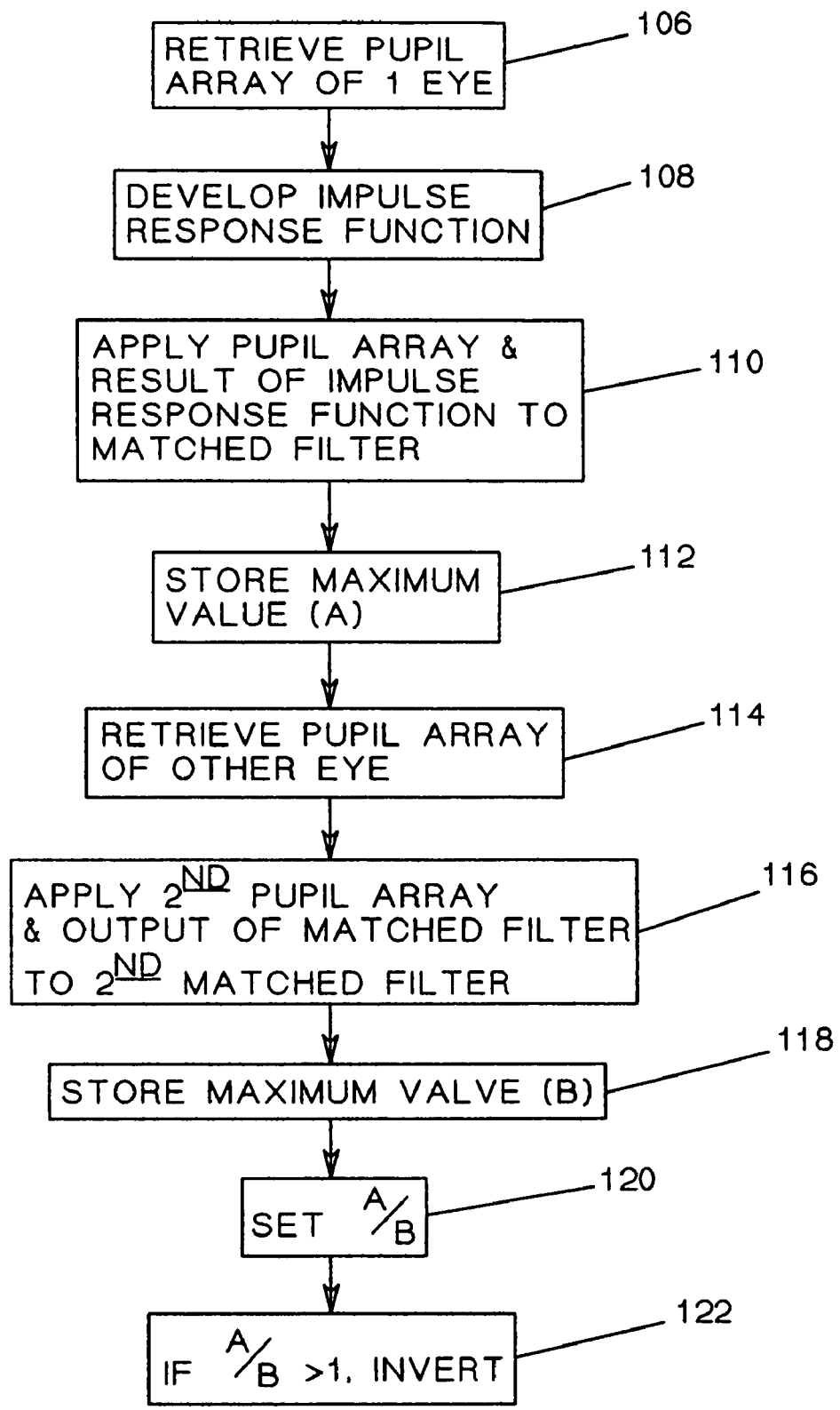
Figure 8A:
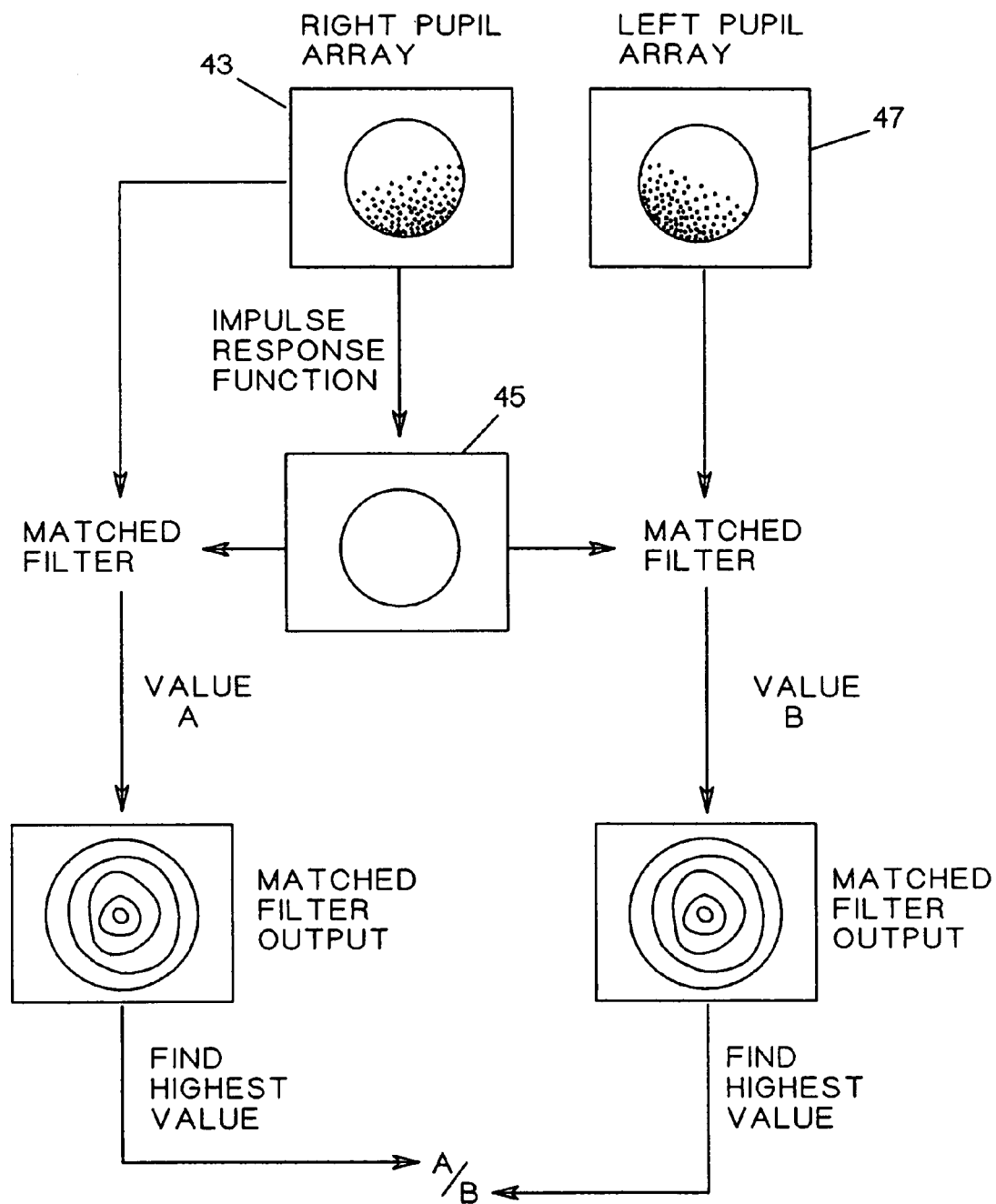

Referring now to FIG. 8, from reference A 710, the process continues to step 801. In step 801, a second input data stream is obtained. In step 802, second time stamp information for the second input data stream is obtained. In step 803, a second lowest bit occurrence constraint is determined based on the second time stamp information and the buffer delay information. In step 804, a second highest bit occurrence constraint is determined based on shifting the second lowest bit occurrence constraint upward. In step 805, a second earliest time constraint is determined based on the second highest bit occurrence constraint. In step 806, a second latest time constraint is determined based on the second lowest bit occurrence constraint. From step 806, the process continues to reference B 807. In an embodiment of the invention, the second input data stream has a second substantially constant bit rate.

Figure 9:
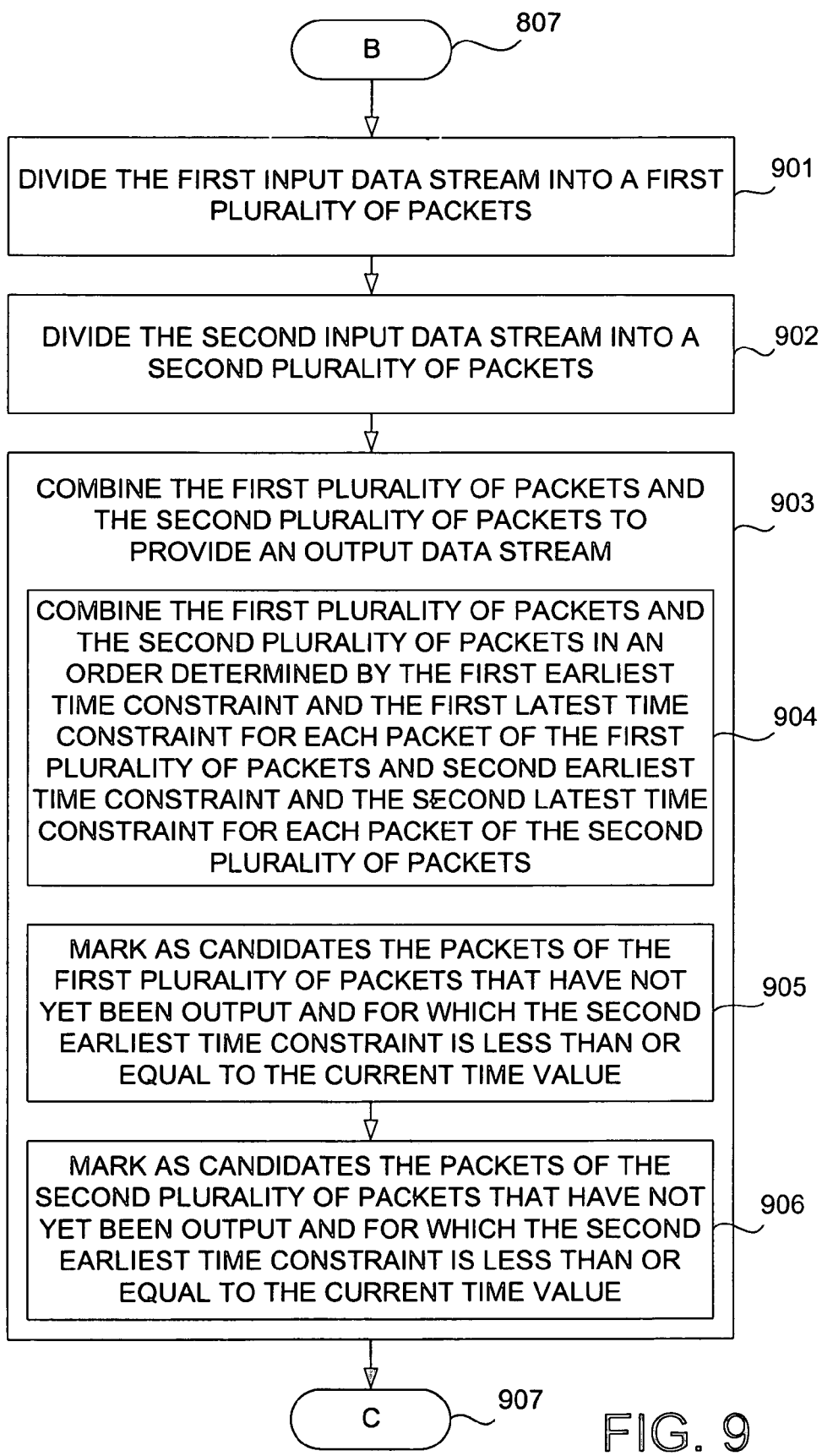

Referring now to FIG. 9, from reference B 807, the process continues to step 901. In step 901, the first input data stream is divided into a first plurality of packets. In step 902, the second input data stream is divided into a second plurality of packets. In step 903, the first plurality of packets and the second plurality of packets are combined to provide an output data stream. Step 903 may also include step 904. In step 904, the first plurality of packets and the second plurality of packets are combined in an order determined by the first earliest time constraint and the first latest time constraint for each packet of the first plurality of packets and second earliest time constraint and the second latest time constraint for each packet of the second plurality of packets.

In one embodiment of the invention, the first latest time constraint for each packet of the first plurality of packets is determined in relation to a first initial bit of each packet of the first plurality of packets and the second latest time constraint for each packet of the second plurality of packets is determined in relation to a second initial bit of each packet of the second plurality of packets. In one embodiment of the invention, the first earliest time constraint for each packet of the first plurality of packets is determined in relation to a first final bit of each packet of the first plurality of packets and the second earliest time constraint for each packet of the second plurality of packets is determined in relation to a second final bit of each packet of the second plurality of packets.

Step 903 may also include steps 905 and 906. In step 905, the process includes marking as candidates the packets of the first plurality of packets that have not yet been output and for which the first earliest time constraint is less than or equal to the current time value. In step 906, the process includes marking as candidates the packets of the second plurality of packets that have not yet been output and for which the second earliest time constraint is less than or equal to the current time value. From step 903, the process continues to reference C 907. In one embodiment of the invention, the output data stream is a Moving Picture Experts Group (MPEG) stream.

Figure 10:
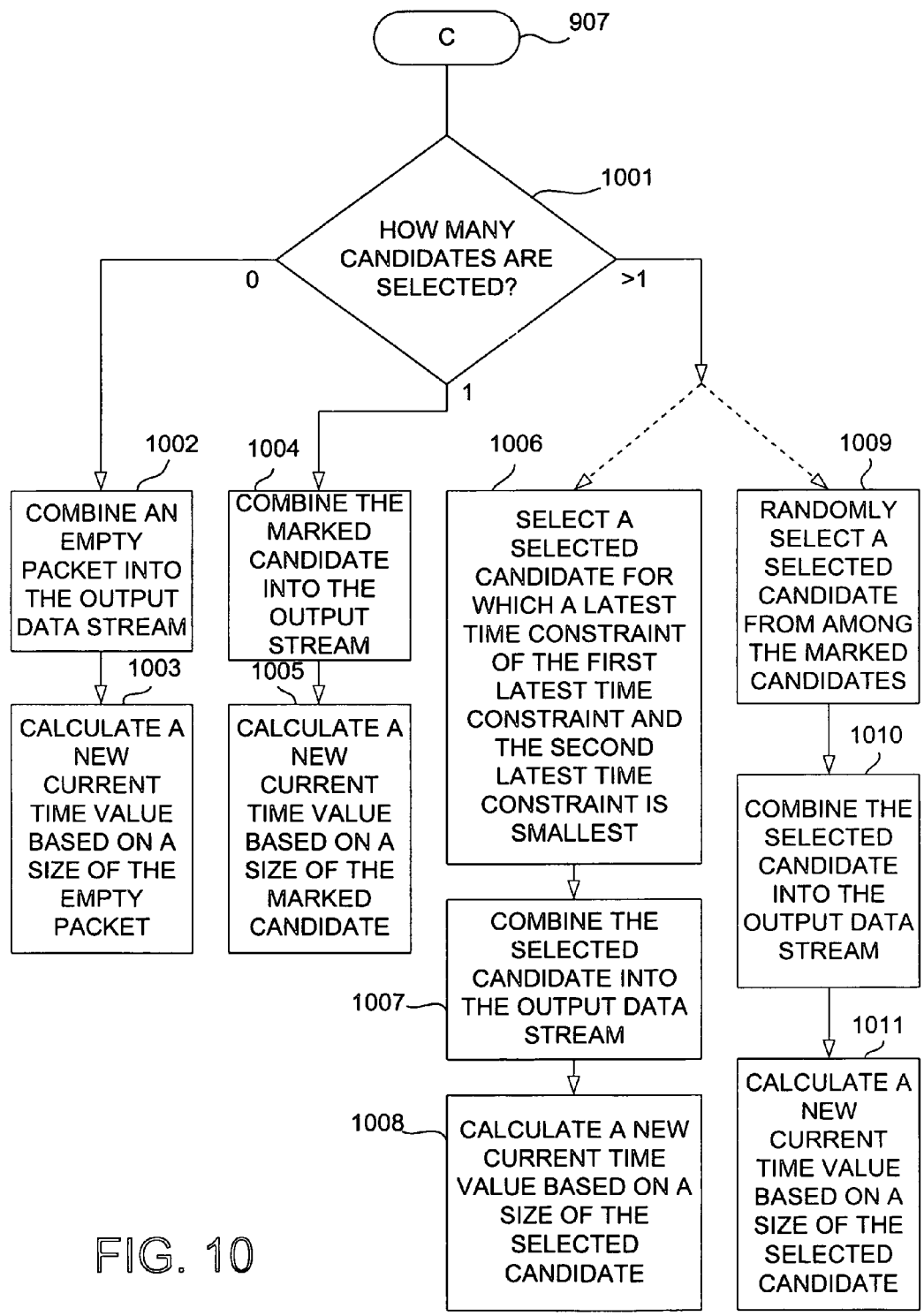

Referring now to FIG. 10, from the reference C 907, the process continues to step 1001. In step 1001, a determination is made as to how many candidates have been selected. If no candidates have been selected, the process continues to step 1002. In step 1002, an empty packet is combined into the output data stream. In step 1003, a new current time value is calculated based on a size of the empty packet.

When, in step 1001, exactly one of the candidates is found to be marked, the process continues to step 1004. In step 1004, the marked candidate is combined into the output stream. In step 1005, a new current time value is calculated based on a size of the marked candidate.

When, in step 1001, it is determined that more than one of the candidates is marked, the process continues to either of steps 1006 or 1009. In step 1006, selection of a selected candidate for which a latest time constraint of the first latest time constraint and the second latest time constraint is smallest is performed. In step 1007, the selected candidate is combined into the output data stream. In step 1008, a new current time value is calculated based on a size of the selected candidate.

In step 1009, when more than one of the candidates is marked, a selected candidate is randomly selected from among the marked candidates. In step 1010, the selected candidate is combined into the output data stream. In step 1011, a new current time value is calculated based on a size of the selected candidate.

Figure 11:
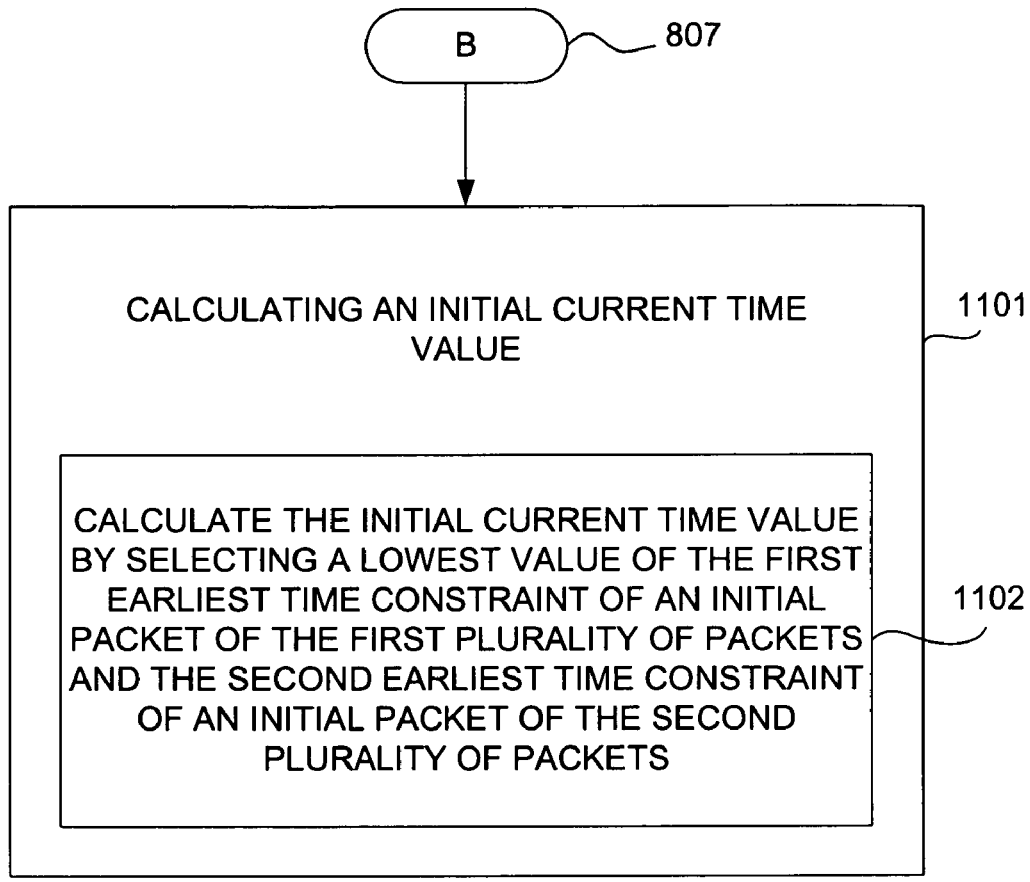

Referring now to FIG. 11, from reference B 807, the process continues in step 1101. In step 1101, an initial current time value is calculated. Step 1101 may also include step 1102. In step 1102, the initial current time value is calculated by selecting a lowest value of the first earliest time constraint of an initial packet of the first plurality of packets and the second earliest time constraint of an initial packet of the second plurality of packets.

In one embodiment, the invention may be implemented using a program storage device readable by a machine, the program storage device tangibly embodying a program of instructions executable by the machine to perform steps for multiplexing data streams provided as inputs to the machine. The steps performed may be the same steps described elsewhere herein.

Figure 12:
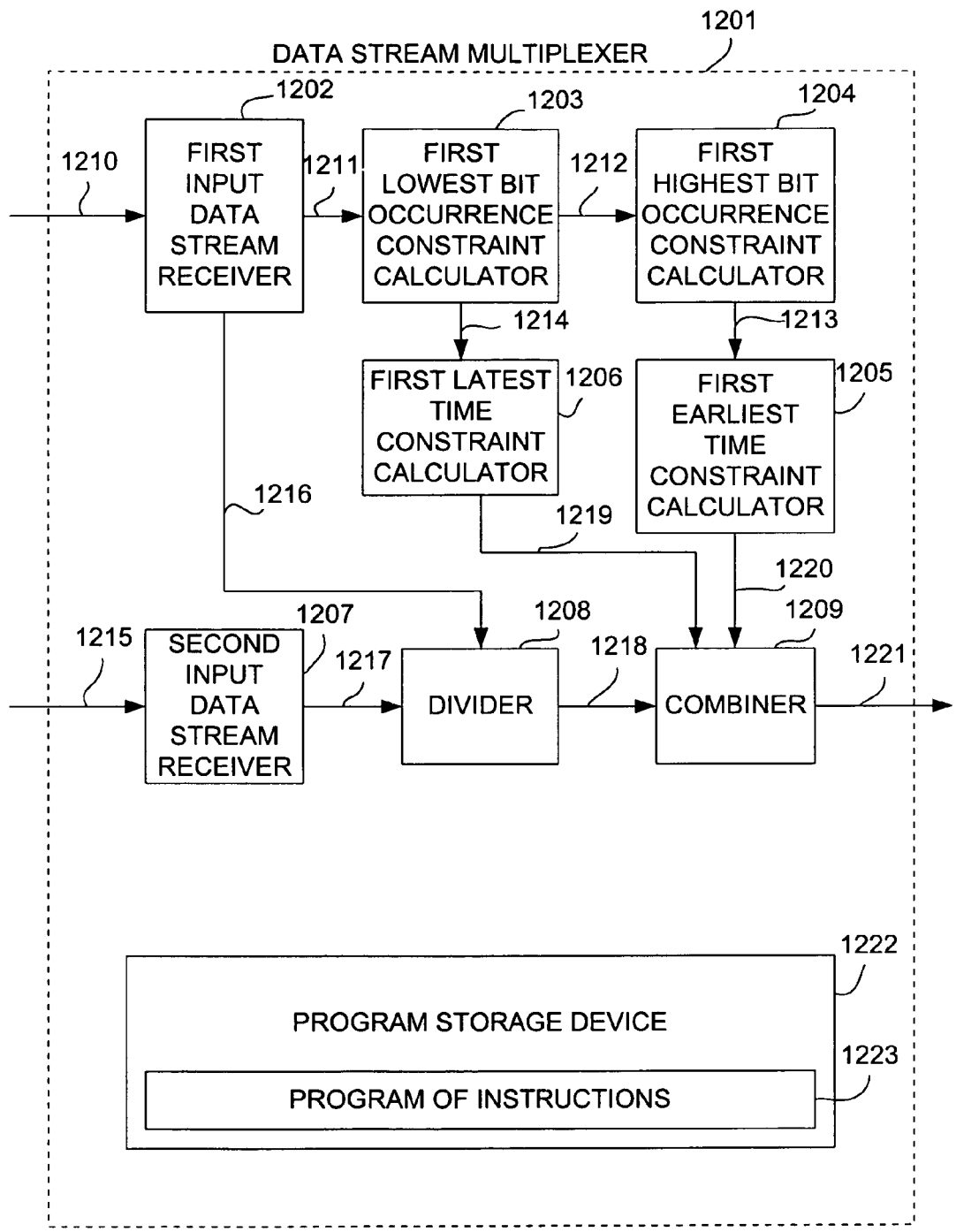
FIG. 12 is a block diagram illustrating a data stream multiplexer in accordance with the present invention.

FIG. 12 is a block diagram illustrating a data stream multiplexer in accordance with the present invention. The data stream multiplexer 1201 receives a plurality of input data streams and combines the plurality of input data streams to provide an output data stream. The multiplexer 1201 includes a first input data stream receiver 1202 for receiving a first input data stream 1210. The multiplexer 1201 also includes a first lowest bit occurrence constraint calculator 1203 operatively coupled to the first input data stream receiver 1202 via coupling 1211 for calculating a first lowest bit occurrence constraint based on first time stamp information derived from the first input data stream and buffer delay information. The multiplexer 1201 further includes a first highest bit occurrence constraint calculator 1204 operatively coupled to the first lowest bit occurrence constraint calculator 1203 via coupling 1212 for calculating a first highest bit occurrence constraint based on shifting the first lowest bit occurrence constraint upward.

Additionally, the multiplexer 1201 includes a first earliest time constraint calculator 1205 operatively coupled to the first highest bit occurrence constraint calculator 1204 via coupling 1213 for calculating a first earliest time constraint based on the first highest bit occurrence constraint. The multiplexer 1201 further includes a first latest time constraint calculator 1206 operatively coupled to the first lowest bit occurrence constraint calculator 1203 via coupling 1214 for calculating a first latest time constraint based on the first lowest bit occurrence constraint.

In one embodiment, the multiplexer 1201 also includes a second input data stream receiver 1207 for receiving a second input data stream 1215. The multiplexer 1201 further includes a divider 1208 operatively coupled to the first input data stream receiver 1202 via coupling 1216 and to the second input data stream receiver 1207 via coupling 1217 to divide the first input data stream into a first plurality of packets and to divide the second input data stream into a second plurality of packets. The multiplexer 1201 also includes a combiner 1209 coupled to the divider 1208 via coupling 1218 for combining the first plurality of packets and the second plurality of packets to provide an output data stream 1221. In one embodiment of the invention, the output data stream 1221 is a drift-free Moving Picture Experts Group (MPEG) program stream.

The data stream multiplexer 1201 may be implemented using a program storage device 1222. The program storage device 1222 may include a program of instructions 1223.

Figure 13:
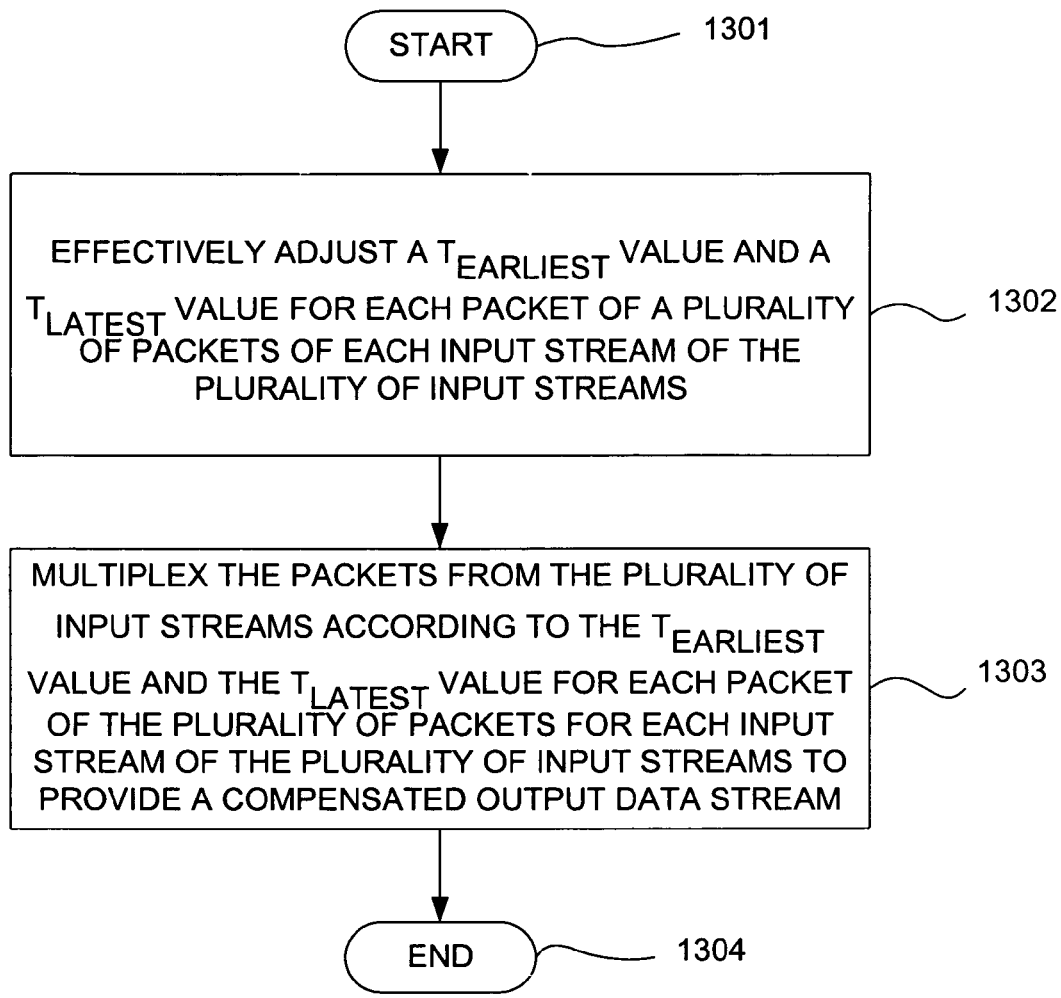
FIG. 13 is a flow diagram of a method for compensating for drift among a plurality of input streams in accordance with the present invention.

FIG. 13 is a flow diagram of a method for compensating for drift among a plurality of input streams in accordance with the present invention. The method begins in step 1301. In step 1302, a $t_{earliest}$ value and a $t_{latest}$ value for each packet of a plurality of packets for each input stream of the plurality of input streams are effectively adjusted. In step 1303, the packets from the plurality of input streams are multiplexed according to the $t_{earliest}$ value and the $t_{earliest}$ value for each packet of the plurality of packets for each input stream of the plurality of input streams to provide a compensated output data stream. In step 1304, the method ends.

In one embodiment of the invention, the relationship between the $t_{earliest}$ value and the $t_{latest}$ value is determined based on buffer delay information. In one embodiment of the invention, the plurality of input streams have substantially constant bit rates. The plurality of the streams may vary from the substantially constant bit rates as influenced by drift.

In one embodiment of the invention, the buffer delay information is derived from the plurality of input streams. The plurality of input streams may include, for example, a video stream, an audio stream, a closed caption stream, and/or a content protection data stream. In one embodiment of the invention, the compensated output data stream is a Moving Picture Experts Group (MPEG) stream.

It should be understood that the implementation of other variations and modifications of the invention in its various aspects will be apparent to those of ordinary skill in the art, and that the invention is not limited by the specific embodiments described. For example, the specific number of data streams being multiplexed, their types, and their relationships may be varied. As another example, the type and nature of the output data streams may also be varied. It is therefore contemplated to cover by the present invention, any and all modifications, variations, or equivalents that fall within the spirit and scope of the basic underlying principles disclosed and claimed herein.

What is claimed is:

1. A method for multiplexing data streams comprising:
   obtaining a first input data stream;
   obtaining first time stamp information for the first input data stream;
   obtaining buffer delay information;
   determining a first lowest bit occurrence constraint based on the first time stamp information and the buffer delay information;
   determining a first highest bit occurrence constraint based on shifting the first lowest bit occurrence constraint upward;
   determining a first earliest time constraint based on the first highest bit occurrence constraint;
   determining a first latest time constraint based on the first lowest bit occurrence constraints;
   dividing the first input data stream into a first plurality of packets;
   dividing the second input data stream into a second plurality of packets; and
   combining the first plurality of packets and the second plurality of packets to provide an output data stream by combining the first plurality of packets and the second plurality of packets in an order determined by the first earliest time constraint and the first latest time constraint for each packet of the first plurality of packets and second earliest time constraint and the second latest time constraint for each packet of the second plurality of packets.

2. The method of claim 1 wherein the first lowest bit occurrence constraint increases substantially linearly over time.

3. The method of claim 1 wherein the first lowest bit occurrence constraint varies from increasing linearly over time to accommodate drift of the first input data stream.

4. The method of claim 1 wherein the first input data stream has a substantially constant bit rate.

5. The method of claim 1 wherein the first input data stream varies from a constant bit rate as influenced by drift.

6. The method of claim 1 wherein the first input data stream has a substantially constant frame rate.

7. The method of claim 1 wherein the first input data stream has a variable frame rate.

8. The method of claim 1 wherein the first input data stream has a constant frame size.

9. The method of claim 1 wherein the first input data stream has a variable frame size.

10. The method of claim 1 wherein the first input data stream includes buffer delay information.

11. The method of claim 1 wherein the first input data stream is selected from a group consisting of:
    a video stream;
    an audio stream;
    a closed caption stream; and
    a content protection data stream.

12. The method of claim 1 wherein determining the first highest bit occurrence constraint based on shifting the first lowest bit occurrence constraint upward further comprises:
   determining the first highest bit occurrence constraint based on shifting the first lowest bit occurrence constraint upward by a constant amount.

13. The method of claim 1 further comprising:
   obtaining a second input data stream;
   obtaining second time stamp information for the second input data stream;
   determining a second lowest bit occurrence constraint based on the second time stamp information and the buffer delay information;
   determining a second highest bit occurrence constraint based on shifting the second lowest bit occurrence constraint upward;
   determining a second earliest time constraint based on the second highest bit occurrence constraint; and
   determining a second latest time constraint based on the second lowest bit occurrence constraint.

14. The method of claim 13 wherein the second input data stream has a second substantially constant bit rate.

15. The method of claim 13 further comprising:
   calculating an initial current time value.

16. The method of claim 15 wherein calculating an initial current time value comprises:
   calculating the initial current time value by selecting a lowest value of the first earliest time constraint of an initial packet of the first plurality of packets and the second earliest time constraint of an initial packet of the second plurality of packets.

17. The method of claim 1 wherein the first latest time constraint for each packet of the first plurality of packets is determined in relation to a first initial bit of each packet of the first plurality of packets and the second latest time constraint for each packet of the second plurality of packets is determined in relation to a second initial bit of each packet of the second plurality of packets.

18. The method of claim 17 wherein the first earliest time constraint for each packet of the first plurality of packets is determined in relation to a first final bit of each packet of the first plurality of packets and the second earliest time constraint for each packet of the second plurality of packets is determined in relation to a second final bit of each packet of the second plurality of packets.

19. The method of claim 1 wherein the output data stream is a Moving Picture Experts Group (MPEG) stream.

20. A data stream multiplexer receiving a plurality of input data streams and combining the plurality of input data streams to provide an output data stream, the multiplexer comprising:
   a first input data stream input for receiving a first input data stream;
   a first lowest bit occurrence constraint calculator operatively coupled to the first input data stream input for calculating a first lowest bit occurrence constraint based on first time stamp information derived from the first input data stream and buffer delay information;
   a first highest bit occurrence constraint calculator operatively coupled to the first lowest bit occurrence constraint calculator for calculating a first highest bit occurrence constraint based on shifting the first lowest bit occurrence constraint upward;
   a first earliest time constraint calculator operatively coupled to the first highest bit occurrence constraint calculator for calculating a first earliest time constraint based on the first highest bit occurrence constraint;
   a first latest time constraint calculator operatively coupled to the first lowest bit occurrence constraint calculator for calculating a first latest time constraint based on the first lowest bit occurrence constraints;
   a second input data stream input for receiving a second input data stream;
   a divider operatively coupled to the first input data stream input and to the second input data stream input to divide the first input data stream into a first plurality of packets and to divide the second input data stream into a second plurality of packets;
   a combiner coupled to the divider for combining the first plurality of packets and the second plurality of packets to provide an output data stream wherein the combiner combines the first plurality of packets and the second plurality of packets in an order determined by the first earliest time constraint and the first latest time constraint for each packet of the first plurality of packets and second earliest time constraint and the second latest time constraint for each packet of the second plurality of packets.

21. The data stream multiplexer of claim 20 wherein the output data stream is a drift-free Moving Picture Experts Group (MPEG) program stream.

22. A program storage device readable by a machine, the program storage device tangibly embodying a program of instructions executable by the machine to perform steps for multiplexing data streams provided as inputs to the machine comprising:
   obtaining a first input data stream;
   obtaining first time stamp information for the first input data stream;
   obtaining buffer delay information;
   determining a first lowest bit occurrence constraint based on the first time stamp information and the buffer delay information;
   determining a first highest bit occurrence constraint based on shifting the first lowest bit occurrence constraint upward;
   determining a first earliest time constraint based on the first highest bit occurrence constraint;
   determining a first latest time constraint based on the first lowest bit occurrence constraint;
   obtaining a second input data stream;
   obtaining second time stamp information for the second input data stream;
   determining a second lowest bit occurrence constraint based on the second time stamp information and the buffer delay information;
   determining a second highest bit occurrence constraint based on shifting the second lowest bit occurrence constraint upward;
   determining a second earliest time constraint based on the second highest bit occurrence constraint;
   determining a second latest time constraint based on the second lowest bit occurrence constraint;
   dividing the first input data stream into a first plurality of packets;
   dividing the second input data stream into a second plurality of packets; and
   combining the first plurality of packets and the second plurality of packets to provide an output data stream by combining the first plurality of packets and the second plurality of packets to provide an output data stream further includes combining the first plurality of packets and the second plurality of packets in an order determined by the first earliest time constraint and the first latest time constraint for each packet of the first plurality of packets and second earliest time constraint and the second latest time constraint for each packet of the second plurality of packets.

23. The program storage device of claim 22 wherein determining the first highest bit occurrence constraint based on shifting the first lowest bit occurrence constraint upward further comprises:
   determining the first highest bit occurrence constraint based on shifting the first lowest bit occurrence constraint upward by a constant amount.

24. The program storage device of claim 22 further comprising:
   calculating an initial current time value.

25. The program storage device of claim 24 wherein calculating an initial current time value includes:
   calculating the initial current time value by selecting a lowest value of the first earliest time constraint of an initial packet of the first plurality of packets and the second earliest time constraint of an initial packet of the second plurality of packets.

26. A method for multiplexing data streams comprising:
   obtaining a first input data stream wherein the first input data stream includes buffer delay information;
   obtaining first time stamp information for the first input data stream;
   obtaining buffer delay information;
   determining a first lowest bit occurrence constraint based on the first time stamp information and the buffer delay information;
   determining a first highest bit occurrence constraint based on shifting the first lowest bit occurrence constraint upward;
   determining a first earliest time constraint based on the first highest bit occurrence constraint; and
   determining a first latest time constraint based on the first lowest bit occurrence constraint.

27. A method for multiplexing data streams comprising:
   obtaining a first input data stream;
   obtaining first time stamp information for the first input data stream;
   obtaining buffer delay information;
   determining a first lowest bit occurrence constraint based on the first time stamp information and the buffer delay information;
   determining a first highest bit occurrence constraint based on shifting the first lowest bit occurrence constraint upward;
   determining a first earliest time constraint based on the first highest bit occurrence constraint;
   determining a first latest time constraint based on the first lowest bit occurrence constraint;
   obtaining a second input data stream;
   obtaining second time stamp information for the second input data stream;
   determining a second lowest bit occurrence constraint based on the second time stamp information and the buffer delay information;
   determining a second highest bit occurrence constraint based on shifting the second lowest bit occurrence constraint upward;
   determining a second earliest time constraint based on the second highest bit occurrence constraint;
   determining a second latest time constraint based on the second lowest bit occurrence constraint;
   calculating an initial current time value; and
   calculating the initial current time value by selecting a lowest value of the first earliest time constraint of an initial packet of the first plurality of packets and the second earliest time constraint of an initial packet of the second plurality of packets.

28. The method of claim 27 wherein combining the first plurality of packets and the second plurality of packets to provide an output data stream comprises:
   marking as candidates the packets of the first plurality of packets that have not yet been output and for which the first earliest time constraint is less than or equal to the current time value;
   marking as candidates the packets of the second plurality of packets that have not yet been output and for which the second earliest time constraint is less than or equal to the current time value.

29. The method of claim 28 further comprising: in the absence of candidates, combining an empty packet into the output data stream.

30. The method of claim 28 further comprising:
   when exactly one of the candidates is marked, combining the marked candidate into the output stream.

31. The method of claim 28 further comprising:
   when more than one of the candidates is marked, selecting a selected candidate for which a latest time constraint of the first latest time constraint and the second latest time constraint is smallest.

32. The method of claim 31 further comprising:
   combining the selected candidate into the output data stream.

33. The method of claim 32 further comprising:
   calculating a new current time value based on a size of the selected candidate.

34. The method of claim 28 further comprising:
   when more than one of the candidates is marked, randomly selecting a selected candidate from among the marked candidates.

35. The method of claim 34 further comprising:
   combining the selected candidate into the output data stream.

36. A program storage device readable by a machine, the program storage device tangibly embodying a program of instructions executable by the machine to perform steps for multiplexing data streams provided as inputs to the machine comprising:
   obtaining a first input data stream;
   obtaining first time stamp information for the first input data stream;
   obtaining buffer delay information;
   determining a first lowest bit occurrence constraint based on the first time stamp information and the buffer delay information;
   determining a first highest bit occurrence constraint based on shifting the first lowest bit occurrence constraint upward;
   determining a first earliest time constraint based on the first highest bit occurrence constraint;
   determining a first latest time constraint based on the first lowest bit occurrence constraint;
   obtaining a second input data stream;
   obtaining second time stamp information for the second input data stream;
   determining a second lowest bit occurrence constraint based on the second time stamp information and the buffer delay information;

determining a second highest bit occurrence constraint based on shifting the second lowest bit occurrence constraint upward;

determining a second earliest time constraint based on the second highest bit occurrence constraint;

determining a second latest time constraint based on the second lowest bit occurrence constraint;

calculating an initial current time value; and calculating the initial current time value by selecting a lowest value of the first earliest time constraint of an initial packet of the first plurality of packets and the second earliest time constraint of an initial packet of the second plurality of packets.

37. The program storage device of claim 36 wherein combining the first plurality of packets and the second plurality of packets to provide an output data stream comprises:

marking as candidates the packets of the first plurality of packets that have not yet been output and for which the first earliest time constraint is less than or equal to the current time value;

marking as candidates the packets of the second plurality of packets that have not yet been output and for which the second earliest time constraint is less than or equal to the current time value.

38. The program storage device of claim 37 further comprising:

in the absence of candidates, combining an empty packet into the output data stream.

39. The program storage device of claim 37 further comprising:

when exactly one of the candidates is marked, combining the marked candidate into the output stream.

40. The program storage device of claim 37 further comprising:

when more than one of the candidates is marked, selecting a selected candidate for which a latest time constraint of the first latest time constraint and the second latest time contraint is smallest.

41. The program storage device of claim 40 further comprising:

combining the selected candidate into the output data stream.

42. The program storage device of claim 37 further comprising:

when more than one of the candidates is marked, randomly selecting a selected candidate from among the marked candidates.

43. The program storage device of claim 42 further comprising:

combining the selected candidate into the output data stream.

44. The program storage device of claim 43 further comprising:

calculating a new current time value based on a size of the selected candidate.

* * * * *